June 13, 1939.　　　H. N. ATWOOD　　　2,162,598
COMPOSITE SHATTERPROOF WINDOW GLASS
Filed Feb. 9, 1937
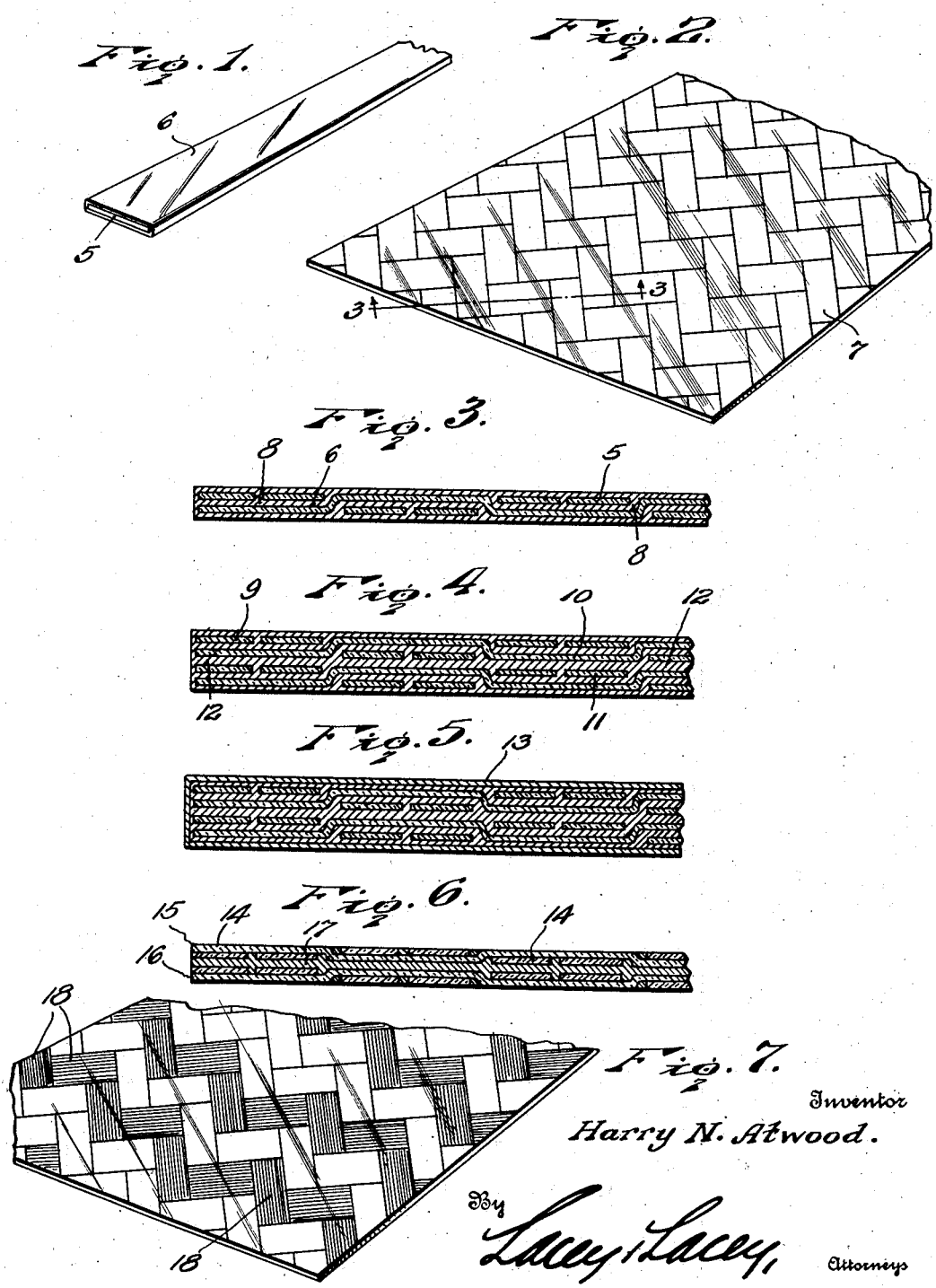
Inventor
Harry N. Atwood.
By Lacey & Lacey,
Attorneys Patented June 13, 1939

2,162,598

UNITED STATES PATENT OFFICE 2,162,598

COMPOSITE SHATTERPROOF WINDOW GLASS

Harry N. Atwood, South Lyndeboro, N. H.

Application February 9, 1937, Serial No. 124,944

9 Claims. (Cl. 49—81)

This invention relates to window glass and more particularly to that type of glass commonly known as "shatterproof" glass.

The object of the invention is to provide a transparent panel, the body of which is formed of relatively thin strips or ribbons of glass encased in transparent plastic material and plaited, interlaced or otherwise interwoven to form a lock-weave structure so that should the panel become accidentally fractured or broken the formation of cracks in the panel will be confined to the fractured ribbon or ribbons and thus prevent radiation or spreading of said cracks throughout the entire surface area of the glass and also prevent flying chips or fragments of glass from cutting, lacerating or otherwise injuring a person.

A further object of the invention is to provide a transparent panel including a core formed of interwoven plasticized glass ribbons each held in suspension and isolated from adjacent ribbons so that no two ribbons can have physical contact with each other, thereby providing a composite transparent panel having great strength and stability without appreciable impairment of visibility.

A further object is to provide a composite window panel, the glass ribbons of which may be either transparent or translucent and made in different contrasting color so as to present various distinctive and ornamental surface designs suitable for the windows of churches, cathedrals and the like.

A further object is to provide a transparent panel which may be fabricated either from a single layer of interwoven plasticized glass ribbons or from superposed layers of ribbons united by an intermediate bonding agent of transparent plastic material.

A further object is to provide a novel method or process of fabricating the glass panels which consists either in treatng strips or ribbons of glass with plastic material to form individual plastic encasements therefor, weaving the plasticized ribbons to form a lock-weave structure and subjecting said structure to the action of heat and pressure or in interweaving the glass ribbons to form upper and lower lock-weave layers connected by an intermediate layer of transparent plastic material and subjecting the structure thus formed to heat and pressure.

Further objects and advantages will appear in the course of the following description.

In the drawing:

Figure 1 is a perspective view of a portion of one of the plasticized glass ribbons from which the transparent panel is made, Figure 2 is a perspective view of a portion of a transparent panel produced by interweaving the plasticized ribbons, Figure 3 is a transverse sectional view taken on the line 3—3 of Figure 2, Figure 4 is a transverse sectional view illustrating a panel of double thickness, Figure 5 is a similar view showing the exterior surfaces of the panel encased in transparent plastic material, Figure 6 is a transverse sectional view of a double strength panel constructed of glass ribbons which have not been plasticized, and Figure 7 is a perspective view of a portion of a transparent panel showing how different surface designs may be produced by making the glass ribbons of contrasting colors.

In carrying the present invention into effect, I take thin strips or ribbons 5 of glass of any desired length, width and thickness, although I prefer that the ribbons be approximately one inch in width and one forty-eighth of an inch in thickness to facilitate easy interweaving or interlocking of the ribbons in the manner hereinafter described. These glass strips or ribbons 5 are then immersed in or passed through a bath of hot molten plastic material, such as semi-liquified cellulose acetate and suitable means is provided whereby a definite substantial and uniform amount of the plastic material adheres to the surface of the glass ribbons so as to form plastic encasements 6.

After the glass strips or ribbons have been passed through or immersed in the molten plastic bath, they are removed and allowed to cool for approximately one minute so as to cause the plastic material enveloping the ribbons to become set or hardened. The plasticized strips or ribbons 5 are then placed on a suitable table or support and braided, woven or interwoven into a fabric lock-weave structure 7 of the desired dimensions, and this process of fabrication may be accomplished by any of the well-known braiding, weaving or fabric-making methods. It is preferred, however, to dispose the glass strips or ribbons diagonally of the support and to weave or interlock said ribbons from opposite sides of the support as by so doing the resultant woven structure 7 may be made in any desired length and the width of the woven structure is limited only by the lengths of the individual ribbons, as will be understood.

While I do not desire to limit myself to any particular style or type of glass ribbon weaving, it is preferred to pass the ends of the ribbons 5 on one side of the support alternately under and over two of the ribbons or strips on the other side of the support whereby a strong close diagonal weave of the construction shown in Figure 2 of the drawing is obtained.

By reference to Figure 3 of the drawing, it will be noted that the woven structure comprises a lock-weave mesh of glass strips or ribbons, each ribbon being enveloped within a substantial plastic encasement 6 so that no glass surface comes in physical contact with any other glass surface but is separated, piece by piece, throughout the entire weave by two layers of plastic material.

It will also be noted by reference to Figure 3 of the drawing that, owing to the interweaving or interlocking of the glass strips or ribbons constituting the core of the panel, said panel will be corrugated both longitudinally and transversely in cross section, thereby materially increasing the strength and durability of said panel. The woven structure 7 is then inserted between suitable pressing elements of any desired construction and subjected to the action of heat and pressure which causes the plastic material constituting the encasements 6 to soften and become firmly united and bonded together so that each individual glass ribbon is, in effect, held in suspension and any cracks, crevices or interstices around or between the ribbons are completely filled by the plastic material, as indicated at 8 in Figure 3 of the drawing. It will thus be seen that a transparent panel of lock-weave structure is produced so that should the panel become accidentally fractured or broken, the formation of cracks in the panel will be confined to the fractured ribbon or ribbons and thereby prevent radiation or spreading of said cracks throughout the entire surface area of the glass and also prevent flying chips or fragments of glass from cutting, lacerating or otherwise injuring a person.

In Figure 4 of the drawing, there is illustrated a modified form of the invention in which the panel is of double thickness. In this form of the device, plasticized ribbons 9 are interwoven in the manner previously described to form upper and lower layers 10 and 11 connected by an intermediate layer of transparent plastic material 12, the parts being subjected to heat and pressure so as to cause the plastic encasements of the individual ribbons 9 of each layer to become bonded to each other and the encasements of both layers to become firmly united to and intimately connected with the intermediate layer of transparent material 12, as will be readily understood.

In Figure 5 of the drawing, I have shown a transparent panel of double thickness in which the outer surfaces of the panel are covered with cellulose acetate, preferably in dry sheet form as indicated at 13. When the sheets 13 are softened during the pressing operation, the cellulose acetate or other plastic material of which said sheets are formed will flow evenly over the upper and lower surfaces of the woven structure and entirely fill the interstices between and around the interwoven ribbons and thus form a smooth hard casing entirely enveloping the panel.

In certain cases, it may be desirable to omit the plastic encasements 6 from the glass ribbons, and in Figure 6 of the drawing, I have shown a double wall thickness of glass constructed in this manner. In other words, glass ribbons 14 without plastic encasements 6 are interwoven to form upper and lower layers 15 and 16 intimately united and connected by an intermediate bonding agent 17 of transparent plastic material.

By making the glass ribbons constituting the lock-weave core of the panel of contrasting colors, as indicated at 18 in Figure 7 of the drawing, various distinctive and ornamental surface designs may be produced suitable for the windows of churches, cathedrals and the like. Moreover, if desired, some of the glass ribbons may be made of transparent material and others of translucent material instead of in contrasting colors.

Attention is here called to the fact that in all forms of the device, with the exception of the structure shown in Figure 6, the glass ribbons are individually encased in transparent plastic material so that said ribbons are individually held in suspension, thereby giving the panel increased strength and stability without appreciable impairment of visibility.

The panels may also be circular in shape or of any other desired marginal contour and made either flat, plano-convex or concavo-convex in cross section so as to permit said panels to be used with good results as lenses for the headlights of automobiles and other vehicles or as lenses for search-lights and the like. When used in this manner, the refraction and the transmission of light rays therethrough will be governed by the thickness and disposition of the overlapped or interlocked glass ribbons constituting the core of the lenses.

From the foregoing description, it is thought that the construction and method of making the panel will be clearly understood by those skilled in the art and further description thereof is deemed unnecessary.

Having thus described the invention, what is claimed as new is:

1. A panel comprising a core of interwoven glass ribbons individually encased in transparent plastic material, and transparent plastic material covering the opposite faces of the panel and intimately combined with and bonded to the plastic encasements of said ribbons.

2. A panel comprising upper and lower layers of interwoven glass ribbons, the ribbons of each layer being individually coated with transparent plastic material and an intermediate layer of plastic material intimately uniting the plastic encasements of the ribbons of both layers and securely bonded thereto.

3. A panel comprising upper and lower layers of interwoven glass ribbons and an intermediate layer of transparent plastic material uniting said upper and lower layers and connected therewith and bonded thereto.

4. A panel comprising a core formed of glass ribbons of appreciable width individually encased in transparent thermo-plastic material and interwoven to form a lock-weave corrugated longitudinally and transversely in cross section, the thermo-plastic material enclosing the ribbons being coalesced and thereby bonded together to form a solid mass having the ribbons embedded therein and spaced from each other by the thermo-plastic material.

5. A building material comprising a core of glass ribbons of greater width than thickness individually encased in transparent thermo-plastic material and interwoven with certain of the ribbons extending alternately over and under adjacent ribbons to produce a lock-weave structure corrugated longitudinally and transversely in cross section, the thermo-plastic material enclosing the ribbons being coalesced and thereby bonded together to form a solid mass having the ribbons embedded therein and spaced from each other by the thermo-plastic material.

6. The method of making glass panels which consists in encasing individual glass ribbons in transparent plastic material, interweaving the ribbons to form a lock-weave structure, applying transparent plastic material to the upper and lower surfaces of the structure, and subjecting said structure to heat and pressure.

7. Structural material comprising a woven core of substantially flat interlocked glass ribbons individually encased in plastic material with the plastic material enclosing the ribbons coalesced and thereby intimately united and bonded together to form a solid mass having the ribbons embedded therein and entirely spaced from each other by the plastic material.

8. A panel having a fixed permanent shape and comprising a core of interwoven glass ribbons of appreciable width individually encased in transparent thermo-plastic material, the said thermo-plastic material being coalesced and thereby intimately united and bonded together to form a solid mass having the ribbons embedded therein.

9. A panel comprising a mass of thermo-plastic material and a woven core formed of thin and substantially flat glass ribbons of appreciable width interengaged to form a mat and individually encased in the thermo-plastic material.

HARRY N. ATWOOD.